US006909993B2

(12) United States Patent
Nakao et al.

(10) Patent No.: US 6,909,993 B2
(45) Date of Patent: Jun. 21, 2005

(54) METHOD FOR DIAGNOSING FAILURE OF A MANUFACTURING APPARATUS AND A FAILURE DIAGNOSIS SYSTEM

(75) Inventors: Takashi Nakao, Kawasaki (JP); Yukihiro Ushiku, Yokohama (JP); Shuichi Samata, Yokohama (JP); Hiroshi Akahori, Yokohama (JP); Ken Ishii, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/228,960

(22) Filed: Aug. 28, 2002

(65) Prior Publication Data
US 2003/0149547 A1 Aug. 7, 2003

(30) Foreign Application Priority Data
Aug. 31, 2001 (JP) ..................... P2001-264278

(51) Int. Cl.[7] .............................................. G06F 11/30
(52) U.S. Cl. ......................................... 702/185; 438/6
(58) Field of Search ............................ 702/185, 57–59, 702/81–84, 182–184; 438/5, 6, 10, 11, 14, 15, 17, 18

(56) References Cited
U.S. PATENT DOCUMENTS 5,864,782 A    1/1999  Mederer et al. ............ 702/182
6,000,830 A  * 12/1999  Asano et al. ............... 700/121
6,131,052 A  * 10/2000  Ban et al. ................... 700/121
6,438,440 B1 *  8/2002  Hayashi ...................... 700/121
6,480,854 B1 * 11/2002  Gross et al. ................. 707/10
6,556,949 B1 *  4/2003  Lyon .......................... 702/182
6,678,569 B2 *  1/2004  Bunkofske et al. ......... 700/108

FOREIGN PATENT DOCUMENTS

JP        63-272450        11/1988
JP         5-27026          3/1993

* cited by examiner

Primary Examiner—Marc S. Hoff
Assistant Examiner—Edward Raymond
(74) Attorney, Agent, or Firm—Finnegan, Henderson, Farabow, Garrett & Dunner, L.L.P.

(57) ABSTRACT

A method for diagnosing failure of a manufacturing apparatus, includes: measuring time series data of characteristics of a reference apparatus which conducts same processes as the manufacturing apparatus, and recording the time series data of the characteristics in a system information storage unit as a system information database; reading out a recipe listed in a process control information database recorded in a process control information storage unit; driving and controlling the manufacturing apparatus, measuring time series data of the characteristics as test data, and outputting the test data in real time, in accordance with the recipe; performing calculations on the test data, and creating failure diagnosis data; and diagnosing the failure of the manufacturing apparatus using the failure diagnosis data and the system information database.

17 Claims, 7 Drawing Sheets

METHOD FOR DIAGNOSING FAILURE OF A MANUFACTURING APPARATUS AND A FAILURE DIAGNOSIS SYSTEM

CROSS REFERENCE TO RELATED APPLICATIONS

This application is based upon and claims the benefit of priority from prior Japanese Patent Application P2001-264278 filed on Aug. 31, 2001; the entire contents of which are incorporated herein by reference.

BACKGROUND OF THE INVENTION

1. Field of the Invention

The present invention relates to technology for diagnosing the failure of a manufacturing apparatus. In particular, it is related to a failure diagnosis method and failure diagnosis system using a group controller or CIM, which manages a manufacturing apparatus from a higher level of a manufacturing process and performs the control of the manufacturing apparatus using a network.

2. Description of the Related Art

In a conventional semiconductor device manufacturing process, unexpected failure of a semiconductor manufacturing apparatus increases manufacturing costs from the viewpoint of capacity utilization of the semiconductor manufacturing apparatus due to the unexpected suspension of manufacturing required to recover from such failure. In particular, a failure that occurs during the manufacturing process invites on increase in defects in semiconductor devices being processed as well as a reduction in yield due to waste, and directly causes manufacturing costs to increase. Some semiconductor manufacturing apparatus is managed on the premise of failure and life span. For example, evacuation pumps such as dry pumps and mechanical booster pumps are regularly overhauled and replaced. Usually they are replaced early, having a margin of safety ahead of an expected life span determined based on experience in order to avoid catastrophic failure of the semiconductor device or the target of processing due to, for example, the closing down and suspension of the rotating mechanism during the manufacturing process. This, however, is not beneficial because of the increased costs for maintenance.

In addition, a failure of the semiconductor manufacturing apparatus does not always occur with high reproducibility, and there are cases where failures occur during film deposition outside of the predicted average life span.

For problems such as those mentioned above, countermeasures are often taken such as continuing to use apparatus to the limits of the life span so as to minimize maintenance costs and using a method for preventing unexpected failure, other than the average life span, which continuously monitors the temperature and the value of current consumed for the vacuum pump system, sets thresholds for these values, and then when the temperature or the value of the current is above each corresponding threshold, gives a warning to perform maintenance on the vacuum pump system. In the case where the manufacturing apparatus is used in a certain steady condition under limited situations, it is possible to set up a typical value of temperature and current, for example, a threshold value based on a time average value under steady conditions. However, when accommodating the manufacturing of many varieties of semiconductor devices, since each of the manufacturing processes are accommodated in the same manufacturing apparatus, the process conditions required also differ and there is a problem in that one universal threshold value cannot be decided upon as a standard for predicting the failure of the semiconductor manufacturing apparatus.

SUMMARY OF THE INVENTION

A first aspect of the present invention inheres in a method for diagnosing failure of a manufacturing apparatus, including: measuring time series data of characteristics of a reference apparatus which conducts same processes as the manufacturing apparatus, and recording the time series data of the characteristics in a system information storage unit as a system information database; reading out a recipe listed in a process control information database recorded in a process control information storage unit; driving and controlling the manufacturing apparatus, measuring time series data of the characteristics as test data, and outputting the test data in real time, in accordance with the recipe; performing calculations on the test data, and creating failure diagnosis data; and diagnosing the failure of the manufacturing apparatus using the failure diagnosis data and the system information database.

A second aspect of the present invention inheres in a failure diagnosis system, including: a manufacturing apparatus to be diagnosed for failure; a sensor for measuring time series data of characteristics of the manufacturing apparatus, the time series data being output in real time; a real time controller for operating and controlling the manufacturing apparatus in real time; a real time diagnosis module for receiving output of the sensor in real time, calculating the output and producing failure diagnosis data in real time, and determining failure of the manufacturing apparatus in real time; a system information storage unit in which data of characteristics measured for a reference apparatus performing same processes as the manufacturing apparatus is recorded as a system information database; and a process control information storage unit for recording a database of process control information including a recipe for operating and controlling the manufacturing apparatus and outputs instructions to the real time controller.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

Figure 1:
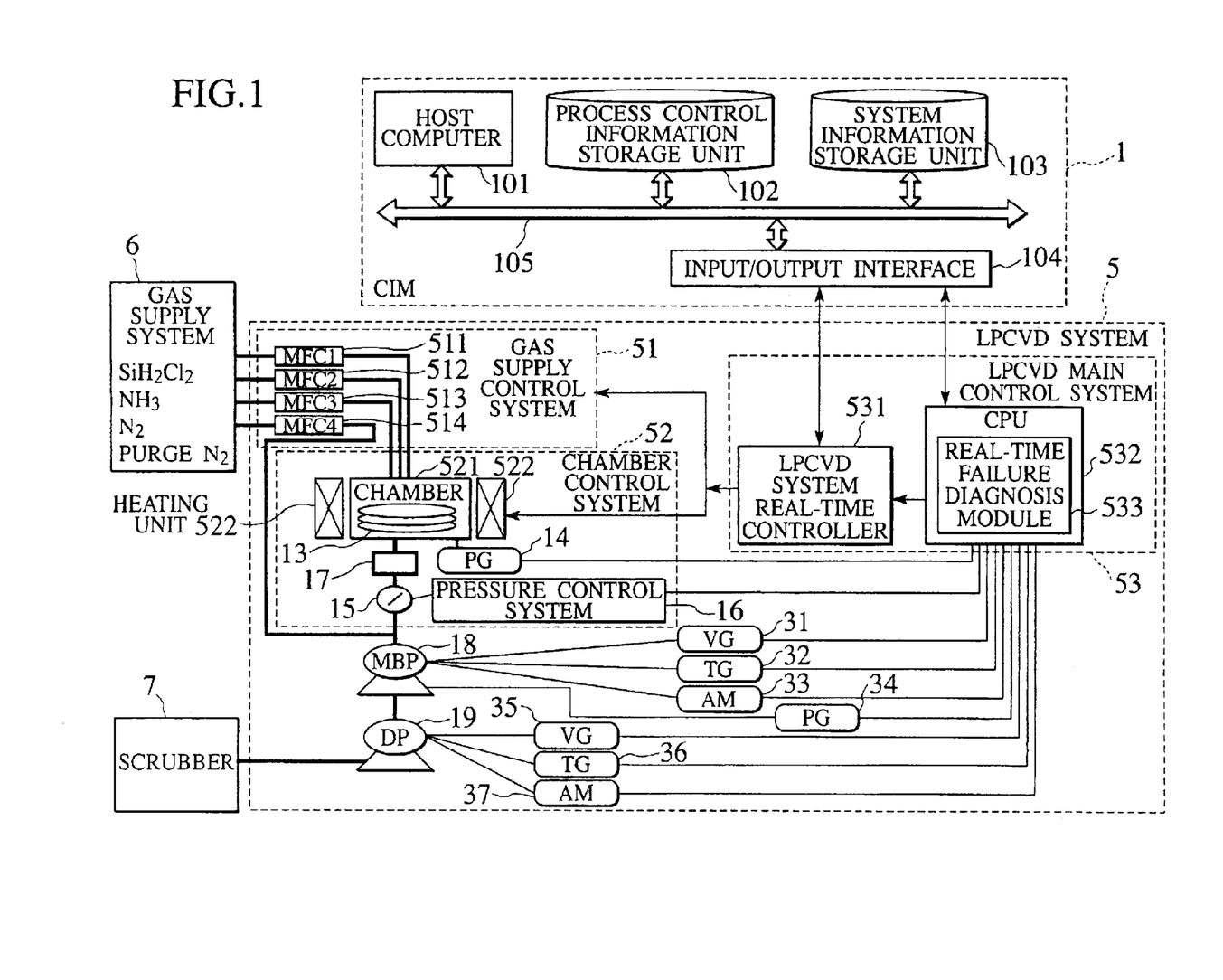
FIG. 1 is a schematic diagram of a system describing a manufacturing apparatus failure diagnosis system according to the first and second embodiment of the present invention.

A failure diagnosis system of a manufacturing apparatus according to a first embodiment of the present invention is described using a system given in FIG. 1, which is constructed by a low pressure chemical vapor deposition (LPCVD) system 5 for growing a silicon nitride film ($Si_3N_4$ film) and a computer integrated manufacturing (CIM) apparatus 1 for performing control/management of the LPCVD system 5. As shown in FIG. 1, the LPCVD system (production apparatus) 5 includes a reaction chamber 521 having a hermetically sealed structure capable of vacuum pumping. On the exhaust side of the reaction chamber 521, a vacuum piping is connected, and on the exhaust side of the vacuum piping, a water-cooled trap 17 with a water-cooled plate for allowing collection of solid reaction by-product is connected. On the exhaust side of the water-cooled trap another vacuum piping 17 is connected, and on the exhaust side of this vacuum piping a pressure control valve 15 is connected. On the exhaust side of the pressure control valve 15 an additional vacuum piping is connected, and on the exhaust side of the additional vacuum piping is connected a vacuum pump system, wherein a mechanical booster pump 18 and a dry pump 19 are connected in series to each other so as to evacuate the inside of the reaction chamber 521. The pressure control valve 15 isolates, if necessary, the reaction chamber 521 from the vacuum pump system (18, 19) so as to adjust the conductance of the evacuation system. Meanwhile, a plurality of gas piping are connected to the reaction chamber 521, and these gas piping are respectively connected to mass-flow controllers 511, 512, 513, 514, and so on. A gas supply control system 51 has the mass-flow controllers 511, 512, 513, 514, . . . , and predetermined gases are supplied to the gas supply control system 51 from a gas supply system 6 of a plant side. More specifically, the flow rates of various source gases and carrier gas introduced into the reaction chamber 521 are respectively controlled by the mass-flow controllers 511, 512, 513, 514, . . . , in the gas supply control system 51. The source gases and the like controlled by the gas supply control system 51 pass through gas piping into the reaction chamber 521, which maintains a low pressure level. An internal temperature of the reaction chamber 521 is controlled by a heating unit 522, which is formed with a heating part and a temperature measurement instrument.

A film deposition of the silicon nitride film using the LPCVD method includes introducing dichlorosilane ($SiH_2Cl_2$) gas as a silicon source under low pressure via the mass-flow controller 511, and introducing an ammonia gas ($NH_3$) as a nitrogen species via the mass-flow controller 512. These gases then chemically react at around 800° C., depositing a thin film of silicon nitride upon a semiconductor substrate 13. The mass-flow controller 513 controls the introduction of a nitrogen ($N_2$) gas into the reaction chamber 521. The chemical reaction between the dichlorosilane gas and the ammonia gas at 800° C. produces a silicon nitride material, and also causes an ammonium chloride ($NH_4Cl$) gas and a hydrogen ($H_2$) gas to develop as reaction by-products. The hydrogen in gas form is evacuated by the vacuum pump system (18, 19) used in the LPCVD system 5. Meanwhile, the ammonium chloride is in a gas form at the time of formation because the inside of the reactive chamber is at a temperature of approximately 800° C. under low pressure conditions of several hundred Pa or less. As shown in FIG. 1, the LPCVD system 5 typically has a water-cooled trap 17, which collects solid reaction by-product, deployed between the LPCVD system 5 and the vacuum pump system (18, 19). The water-cooled trap 17 plays a role in reducing the amount of ammonium chloride or the by-product material adhered to the pressure control valve 15 or the vacuum pump system (18, 19). The source gas and the reaction by-product gas that pass through the vacuum pump system (18, 19), are removed by a scrubber 7. The scrubber 7 removes harmful components extracted by the vacuum pump system (18, 19) through absorption or chemical reaction.

The internal pressure of the reaction chamber 521 is measured by a pressure gauge 14, which is connected to the reaction chamber 521. A capacitance manometer, Pirani gauge, or the like may be used as the pressure gauge 14. A pressure control system 16 is connected to the pressure control valve 15, which adjusts the conductance of the evacuation system based on the difference between a measured pressure value, as measured by the pressure gauge 14, and a set pressure value, as fixed by a chamber control system 52, so that the internal pressure of the reaction chamber 521 may reach a preset value and maintain the preset value. The degree of opening representing the adjustment status of the pressure control valve 15 is output to a LPCVD main control system 53 in real time. In addition, a vibration gauge 31, a temperature gauge 32, and an ammeter 33 are connected to the mechanical booster pump 18, and an exhaust pressure gauge 34 is connected to the exit portion thereof. The ammeter 33 measures current consumed in order to rotate the mechanical booster pump 18. The values measured by the vibration gauge 31, temperature gauge 32, ammeter 33, and exhaust pressure gauge 34, respectively, are output to the LPCVD main control system 53. A vibration gauge 35, a temperature gauge 36, and an ammeter 37 are also connected to a dry pump 19. The ammeter 37 measures consumed current for rotating the dry pump 19. The measured values from the vibration gauge 35, temperature gauge 36, and ammeter 37, respectively, are output to the LPCVD main control system 53. The LPCVD main control system 53 contains an LPCVD system real-time controller 531 and a CPU 532. The LPCVD system real-time controller 531 centrally controls the gas supply control system 51, the heating unit 522, and the pressure control system 16. The CPU 532 includes a real-time failure diagnosis module 533, and the real-time failure diagnosis module 533 performs calculations of failure diagnosis in real time. The real-time failure diagnosis module 533 stores as time-series data the degree of opening of the pressure control valve 15 from the pressure gauge 14 and the pressure control system 16, and respective the output of the vibration gauge 31, temperature gauge 32, ammeter 33, and exhaust pressure gauge 34 connected to the mechanical booster pump 18, and the vibration gauge 35, temperature gauge 36, and ammeter 37 connected to the dry pump 19 (main pump). Moreover, the real-time failure diagnosis module 533 receives in real time output from sensors for characteristics such as the pressure control system 16, the vibration gauges 31, 35, the temperature gauges 32, 36, ammeters 33, 37, or the exhaust pressure gauge 34, performs calculations regarding this output in real time, thus generating a failure diagnosis data group. For example, average value, standard deviation value, process capability index (Cp) value, process capability index value evaluating deviation (Cpk), upper control limit (UCL) value, lower control limit (LCL) value, auto covariance both for time and space of the time series data of the characteristics are calculated. Here, using an upper limit standard as Su, a lower limit standard as Sl, an average value as x, and a standard deviation as σ, in conformity with a type of standard, the process capability index Cp is given as:

with a double side standard $$Cp=(Su-Sl)/6\sigma,\quad (1)$$

with a single side standard for the upper limit $$Cp=(Su-x)/3\sigma,\text{ and}\quad (2)$$

with a single side standard for the lower limit $$Cp=(x-Sl)/3\sigma.\quad (3)$$

The process capability index Cpk is defined in the case of the double side standard only using deviation K as follows:

$$Cpk=(1-K)Cp\quad (4)$$

$$K=|(Su+Sl)/2-x|/((Su-Sl)/2).\quad (5)$$

The real-time failure diagnosis module 533 then determines in real time whether the vacuum pump system (18, 19) is in a normal state or at a state just before failure based on the group of failure diagnosis data. Moreover, based on the determination, a command is given to the LPCVD system real-time controller 531 to initiate either an alarm or a shutoff sequence.

The LPCVD system 5 shown in FIG. 1 is connected to CIM apparatus 1 for performing production management of a plurality of semiconductor production apparatus, and operation of the LPCVD system 5 is controlled by the CIM apparatus 1. The CIM apparatus 1 includes at least a host computer 101, a process control information storage unit 102, and a system information storage unit 103. The host computer 101, the process control information storage unit 102, and the system information storage unit 103 are connected to one another via a bus 105. In addition, an input/output interface 104 is connected to the bus 105, and the LPCVD system 5 exchanges information with the CIM apparatus 1 via the input/output interface 104. Although omitted from the illustrations, in actuality the LPCVD system 5 and the CIM apparatus 1 are connected to each other via an information network such as the Internet or a local area network (LAN). The process control information storage unit 102 includes a process control database for managing process information such as the process conditions or a film deposition recipe for the semiconductor substrate 13. The LPCVD system real-time controller 531 inputs a film deposition recipe, and a pump load test recipe from the process control information storage unit 102, and interprets them in real time to centrally control the gas supply control system 51, the heating unit 522, and the pressure control system 16. The system information storage unit 103 includes a system information database wherein the output values of the measuring instruments attached to the LPCVD system 5 and the vacuum pump system (18, 19) are organized by state at each stage under each film deposition condition and recorded. The measuring instrument output data recorded in the system information storage unit 103 is classified/organized and recorded by the condition, or similar conditions, under which a film corresponding to a product in the process control information storage unit 102 is deposited. In addition, the output from each measuring instrument of a reference semiconductor production apparatus (LPCVD system), either in the same plant as the LPCVD system 5 or in another, connected to the network is similarly respectively recorded in the system information storage unit 103 via the main control unit of that apparatus. The real-time failure diagnosis module 533 obtains statistical characteristics values such as an average over time, standard deviation, and auto covariance as well as obtaining the Mahalanobis distance from the Mahalanobis space (reference space) of the multivariate found from the measured values and the characteristics values stored in the system information storage unit 103, and determining in real time whether the vacuum pump system (18, 19) is in a normal state or at a state just before failure.

Figure 2:
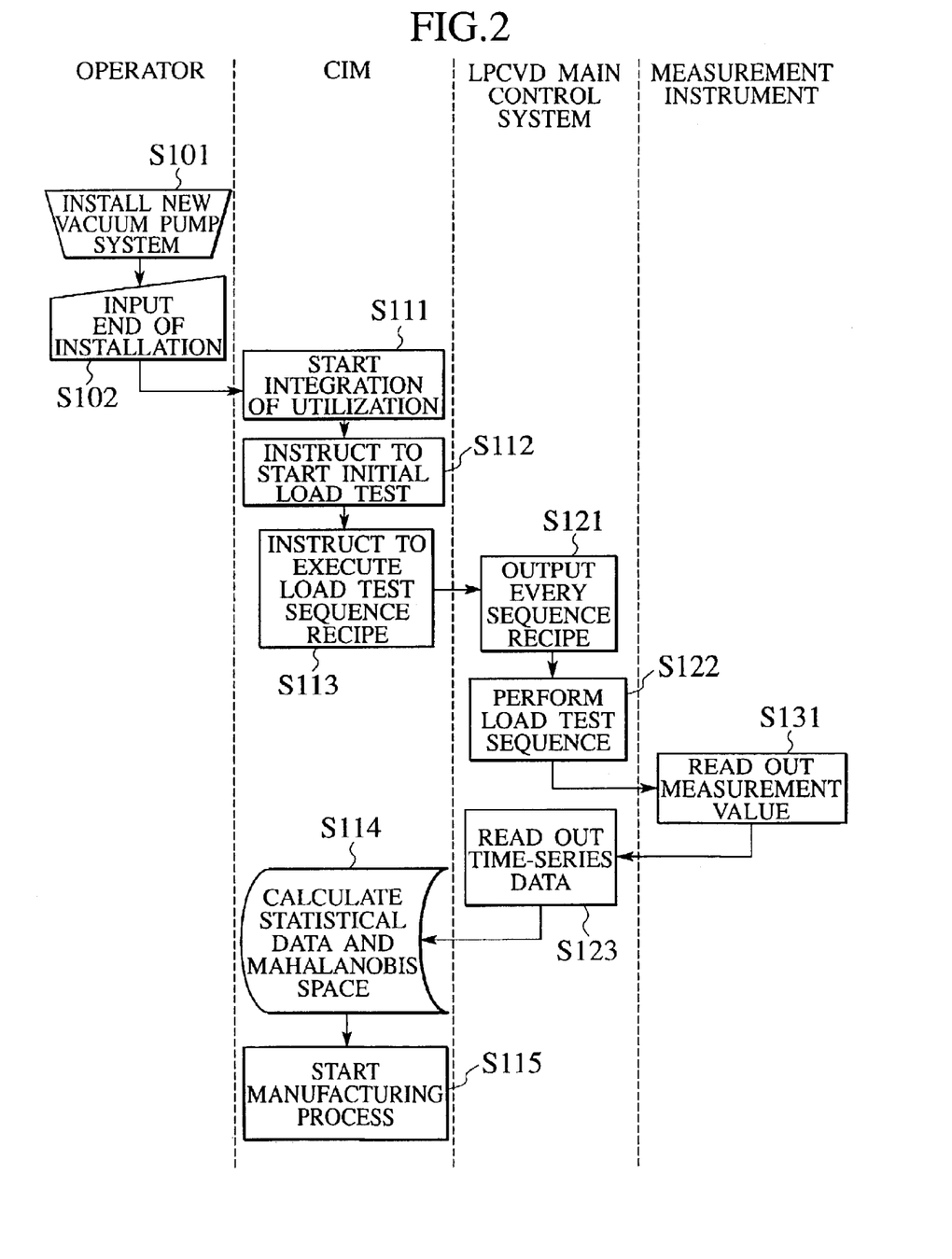
FIG. 2 is a flowchart for describing a failure diagnosis method for manufacturing apparatus according to the first embodiment.

The failure diagnosis method of the manufacturing apparatus according to the first embodiment of the present invention is described forthwith. The flow chart shown in FIG. 2 illustrates the failure diagnosis method when the vacuum pump system (18 and 19) has been newly introduced.

(a) To begin with, in step S101, an operator installs a new mechanical booster pump 18 and a dry pump 19, respectively, in the LPCVD system 5 as a new vacuum pump system (18 and 19). Next, in step S102, the operator inputs information into an arbitrary terminal connected to the CIM apparatus 1, that the installation of the new vacuum pump system (18 and 19) of the LPCVD system 5 is ended.

(b) Once the above information has been input, in step S111, the system information database recorded in the system information storage unit 103 of the CIM apparatus 1 resets the accumulated utilization of the vacuum pump system (18 and 19) in the LPCVD system 5 to zero and begins integrating the utilization.

Figure 3:
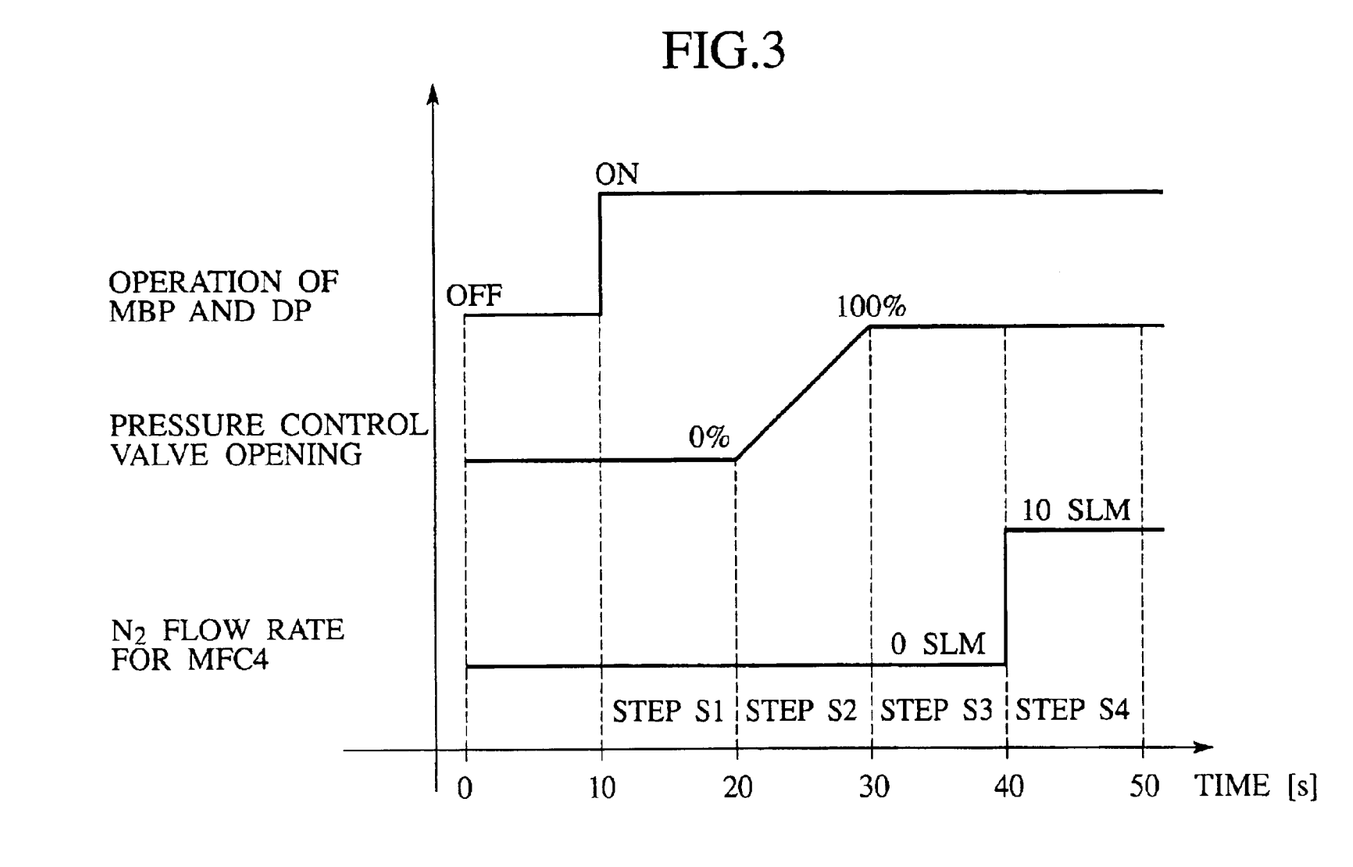
FIG. 3 is a time chart describing a test sequence recipe wherein a load is placed on the vacuum pump system described in FIG. 2.

(c) Furthermore, in step S112, the CIM apparatus 1 instructs the process control information storage unit 102 to conduct a load test of the vacuum pump system (18 and 19) to check the initial condition of the pump. After that, in step S113, instructions are received to output the load test sequence recipe for the vacuum pump system (18 and 19), which includes 4 steps (S1, S2, S3, and S4), from the process control information storage unit 102 to the LPCVD main control system 53 of the LPCVD system 5 and begin carrying out the instructions. In FIG. 3, an overview of the load test is illustrated as a sequence chart.

(d) In step S121, the LPCVD main control system 53 outputs the 4 steps (S1, S2, S3, and S4) of the recipe for the load test sequence by step to the LPCVD system real-time controller 531. Moreover, in step S122, it controls a gas supply control system 51, the vacuum pump system (18 and 19) and the pressure control valve 15 by steps S1, S2, S3 and S4 respectively in accordance with the instructions of the load test sequence.

(e) Then, in step S131, vibration gauge 31, temperature gauge 32, ammeter 33, vibration gauge 35, temperature gauge 36, ammeter 37 and exhaust pressure gauge 34 record measurements via steps S1, S2, S3 and S4 respectively, and these measured values are continuously output in real time to the real-time failure diagnosis module 533 of the LPCVD main control system 53.

(f) Once the real-time failure diagnosis module 533 inputs the measured values of each measuring instrument 31, 32, . . . , 37 in steps S1, S2, S3 and S4 respectively, in step S123, the real time failure diagnosis module 533 records these as 10 second increments time series data of the measured values, and at the same time calculates the average over time, time variance, auto covariance, and characteristics such as the time constant required for stabilizing temperature and vibration after being loaded. The results of calculation are then output to the system information storage unit 103. More specifically, from the LPCVD main control system 53, the calculated characteristics in addition to previous, recorded time series data are output to the system information storage unit 103 and recorded in the system information storage unit 103.

(g) In step S114, a variance-covariance inverse matrix, which prescribes a Mahalanobis space, is calculated with the system information storage unit 103 using all of the time series data recorded to date as multivariate data. Moreover, from these results, the Mahalanobis distance of the new vacuum pump system (18 and 19) at this time is calculated in each step, and at each step it is verified whether or not it is in a normal condition. At the same time, in cases that may be included in a normal condition group, the data for this time is added, and an updated Mahalanobis space is produced.

Alternatively, criteria may be calculated by taking a width that is three times the standard deviation from each of the measured values and characteristics, or from the average value and standard deviation of each variable, making the upper limit and lower limit, or the upper control limit (UCL) and lower control limit (LCL) thereof as threshold values, and then determining cases that fall outside of these threshold values as being abnormal or indicating failure.

(h) Thereafter, in step S115, ordinary use of the LPCVD system 5 is begun and the manufacturing process carried out under ordinary use is started.

FIG. 3 illustrates the recipe of the pump load test sequence designated in step S113, which is performed by steps S1, S2, S3 and S4.

(1) To begin with, in step S1, the vacuum pump system (18 and 19) starts to operate. Note that the pressure control valve 15, which is the gate valve for the reaction chamber 521, is closed fully, and the state where gas does not flow into the vacuum pump system (18 and 19) is held for 10 seconds.

(2) In step S2, for a period of 10 seconds, the pressure control valve 15 is opened to 100 percent linearly adjusting the opening. Here, the reaction chamber 521 is evacuated from normal atmospheric pressure to approximately 0.1 Pa or lower, and the air is flowed into the vacuum pump system (18 and 19). Then, as the load of the vacuum pump system (18 and 19) is increased, the vibration of vacuum pump system (18 and 19) increases. Furthermore, due to the compression of gases, the temperature of vacuum pump system (18 and 19) rises, and the motor driving current of vacuum pump system (18 and 19) goes up as the current flow consumed by vacuum pump system (18 and 19) increases.

(3) In step S3, the evacuation of the inside of the reaction chamber 521 is completed, and, in a state such as that in step S1, there is no inflow of gas into the vacuum pump system (18 and 19) other than leakage at the air seals.

(4) In step S4, 10 SLM of nitrogen is flowed through mass flow controller 514 gradually increasing in stages from 0 SLM to 10 SLM without stopping. At this point, the increase of in vibration and temperature during the 10 seconds of evacuation of gas by the vacuum pump system (18 and 19) is measured. With the LPCVD system 5, ammonia gas normally flows at a rate of approximately 1 SLM. In other words, during this step S4, conditions are made equivalent to an acceleration test where gas is flowed into the vacuum pump system (18, 19) at a flow rate that is between 5 and 30 times the ordinary flow rate, for example, approximately 10 times the ordinary flow rate. By increasing the actual sensitivity of the measuring instrument through the enlargement of the temperature rise and vibration of vacuum pump system (18 and 19) as well as controlling how the load on the vacuum pump system (18 and 19) is applied, the measurement of time constant is facilitated during the period from immediately after the load begins to stabilization of the vacuum pump system (18 and 19).

Figure 4A:
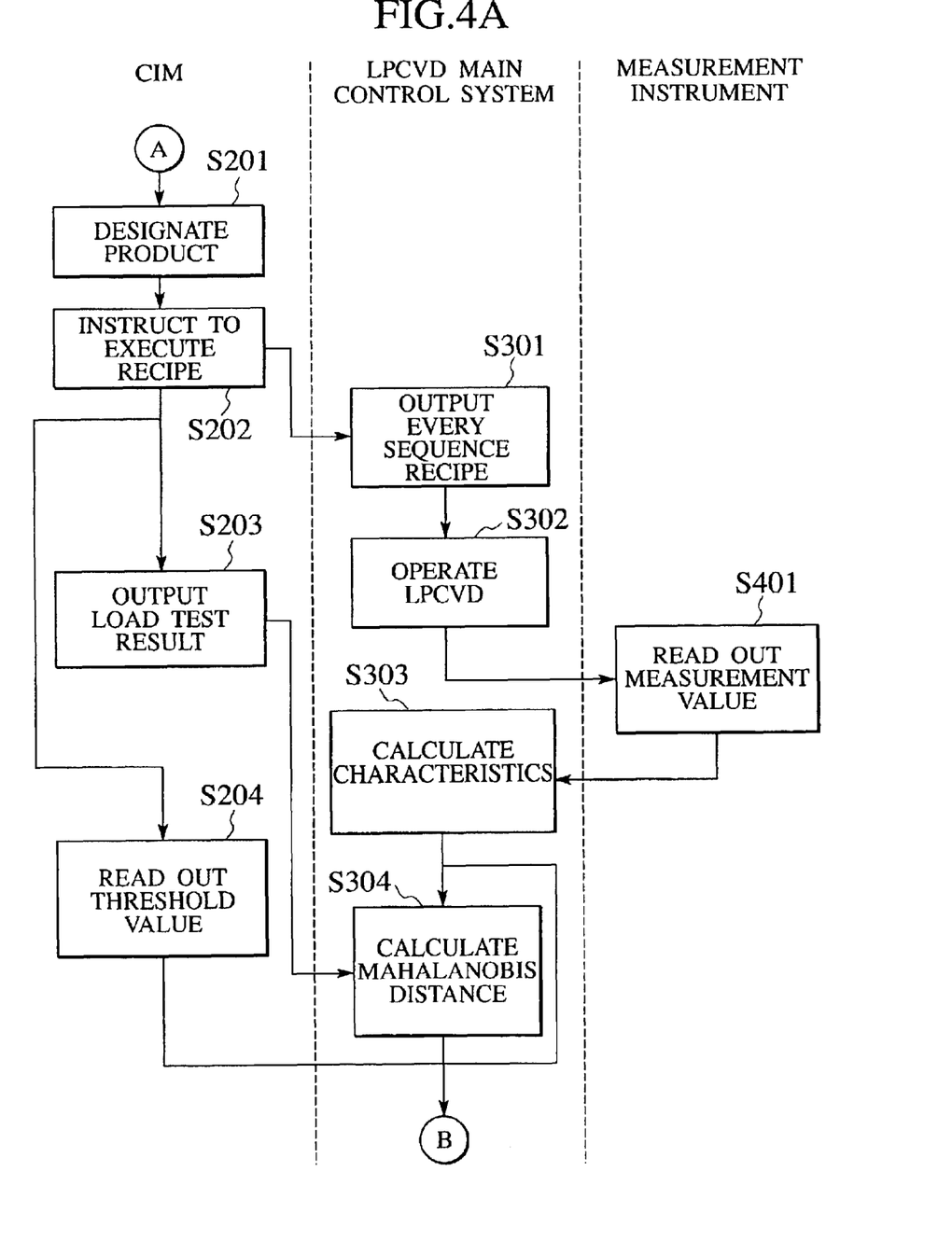
FIGS. 4A through 4C are flowcharts describing the method for diagnosing failure of the manufacturing apparatus according to the first embodiment of the present invention.
Figure 4B:
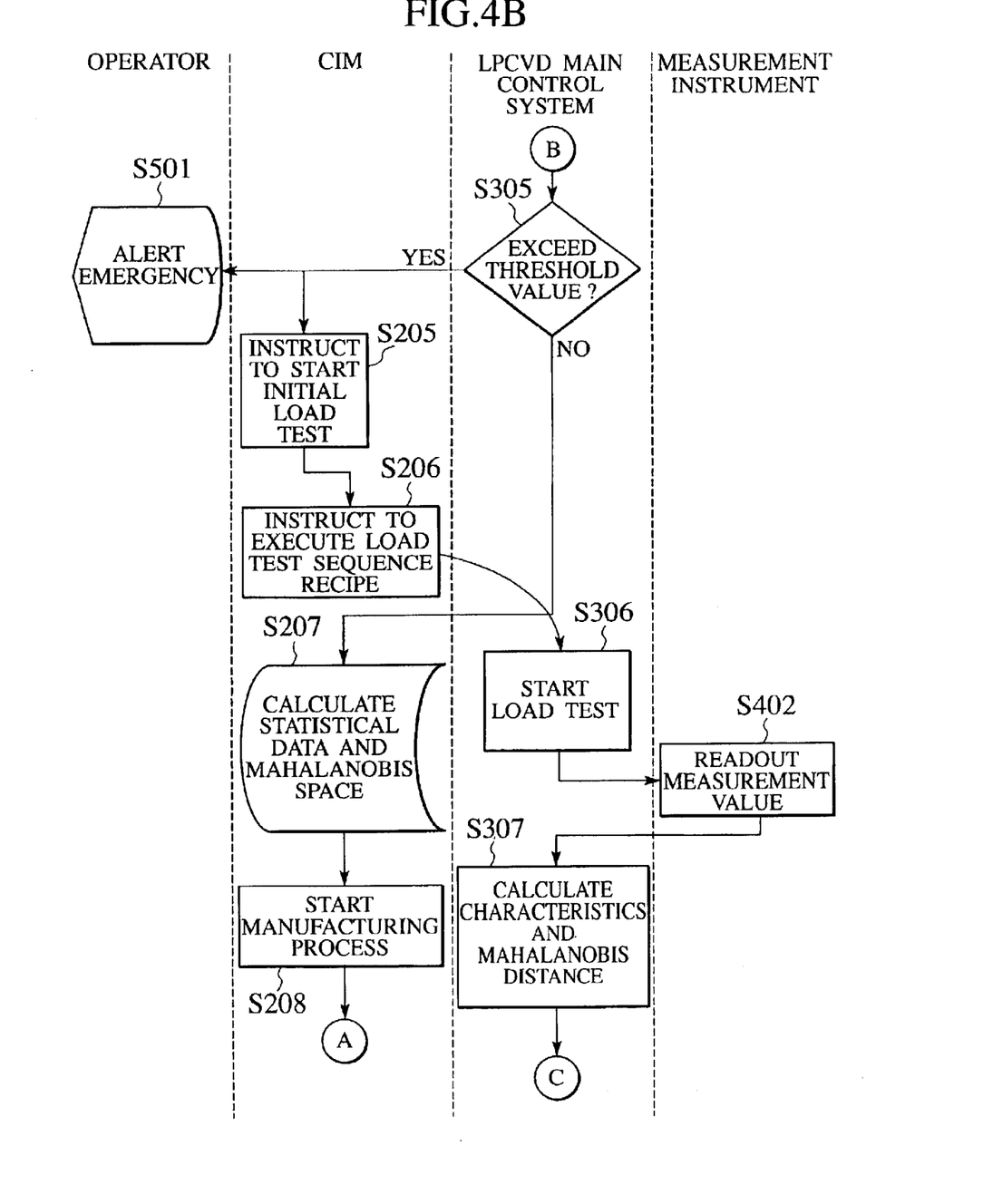
Figure 4C:
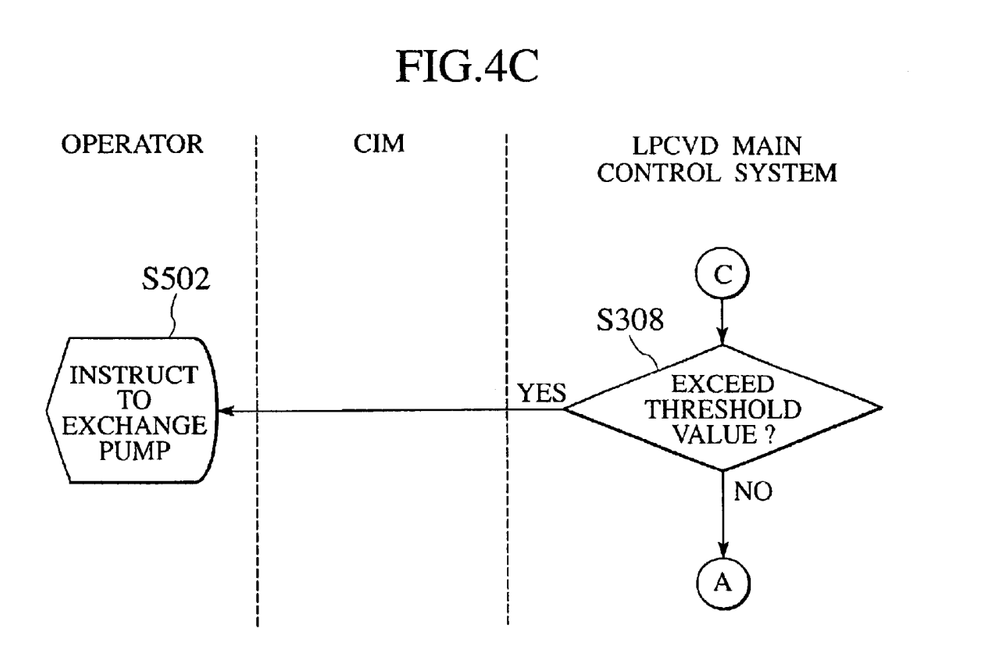

The failure diagnosis method of the manufacturing apparatus according to the first embodiment of the present invention in the event that the vacuum pump system (18 and 19) is used in the manufacturing process in an ordinary manner is described in the flow chart shown in FIGS. 4A through 4C.

(a) To begin with, in step S201, the next product to have film deposited with the LPCVD system 5 is automatically designated from the current wait queue using the process control database recorded in the process control information storage unit 102. In addition, in step S202, the manufacturing process sequence recipe required for the process is output to the LPCVD main control system 53 to instruct the execution of the recipe.

Figure 5:
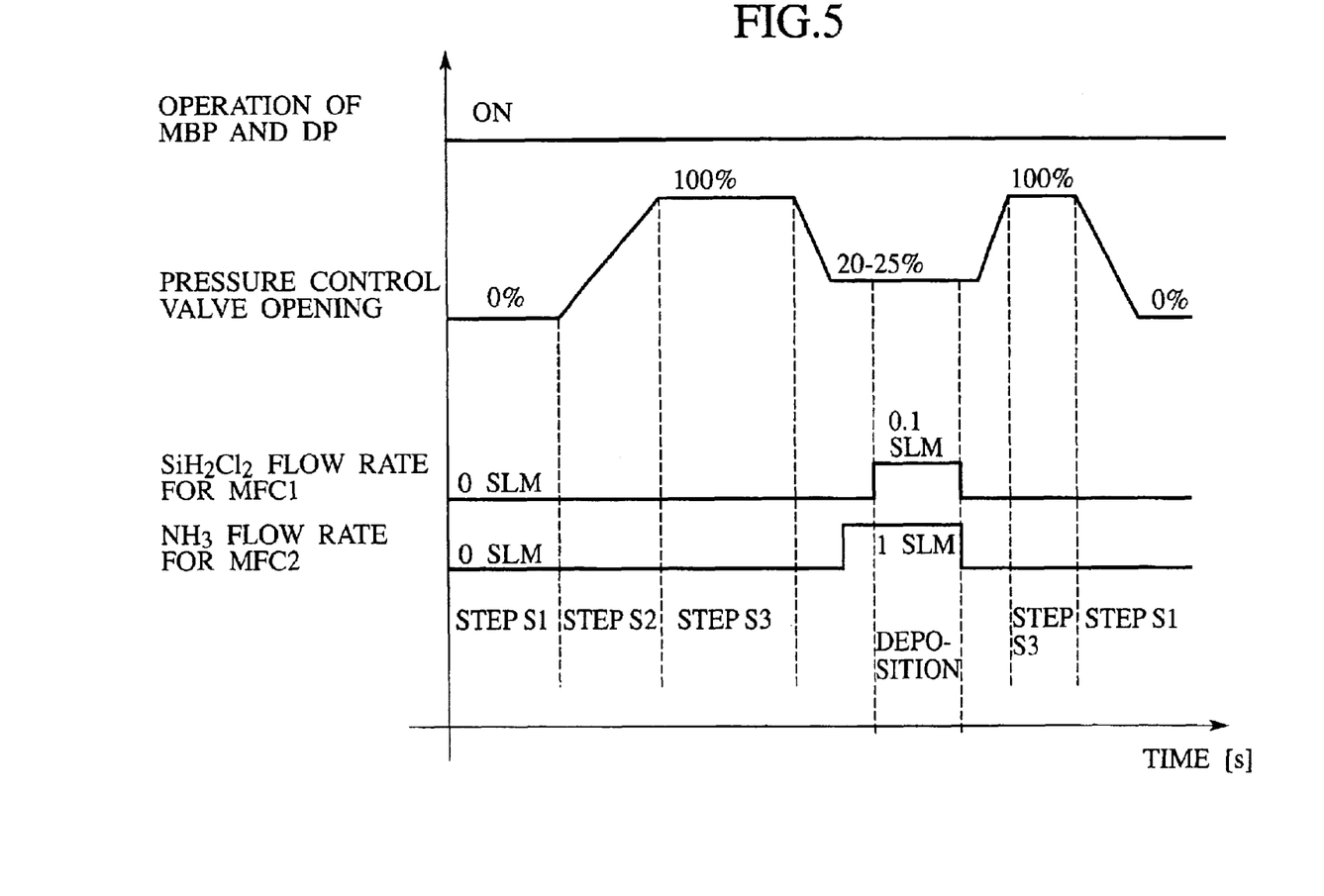
FIG. 5 is a time chart describing a film deposition sequence recipe in the manufacturing process.

(b) A recipe such as that shown in FIG. 5 is output to the LPCVD main control system 53. In step S301, the LPCVD system real time controller 531 outputs the instructions to the LPCVD system real-time controller 531 for each manufacturing process sequence recipe. Then in step S302, the LPCVD system 5 is operated in accordance with the manufacturing process sequence recipe.

(c) Next, in step S401, a vibration gauge 31, temperature gauge 32, ammeter 33, vibration gauge 35, temperature gauge 36, ammeter 37, and exhaust pressure gauge 34 take measurements via steps S1, S2, S3, . . . , S3, and S1 respectively as shown in FIG. 5, and continue outputting these measured values to the real time failure diagnosis module 533 of the LPCVD main control system 53.

(d) As shown in FIG. 5, even in the film deposition sequence, there are times when conditions become similar to a load test corresponding to when vacuum pump system (18 and 19) operation starts up and there are also time when they become similar to steps S1, S2 and S3. In step S303, classification is made by a condition corresponding to Steps S1, S2 and S3, and the characteristics such as the average time value, the time differential value, auto covariance, and the like, are calculated from each measured value in real time.

(e) Meanwhile, when the fact that a situation corresponding to steps S1, S2 and S3 is included in the manufacturing process sequence is confirmed by the process control database of the process control information storage unit 102, in step S203, the average value over time and the variance-covariance in the system information database that includes the result of the load test is output to the LPCVD main control system 53 from the system information database recorded in the system information storage unit 103. In step S203, the system information database further outputs the threshold value of the respective characteristics that determine abnormality in Steps S1, S2, and S3 to the real time failure determination module 53.

(f) The real time failure diagnosis module 533, in step S304, calculates the Mahalanobis distance by the inverse matrix of the average value and variance-covariance for multivariate data that includes the measured values output from respective measuring instruments 31, 32, . . . , 37 and characteristics calculated therefrom, provided by the system information database.

(g) In step S305, the real time failure diagnosis module 533 determines for each step of the film deposition sequence whether or not measured values output from the respective measuring instruments 31, 32, . . . , 37 and the characteristics calculated therefrom fall outside of the UCL or LCL, which are the threshold values. In addition, in Step S305, the real time failure diagnosis module 533 determines whether or not the Mahalanobis distance formed using all of the variables falls outside of the threshold values, for example, 8 in real time.

(h) If there is no abnormality, processing proceeds to step S207 where the value of each variable is recorded in the system information storage unit 103, and UCL, LCL, variance-covariance, and the like, are calculated again. In addition, variables from the measured values of each of the measuring instruments 31, 32, . . . , 37 that occur in the film deposition step, but not seen in the load test, are recorded as new time series data and are also classified by film deposition conditions. As with steps S1 through S4 in the load test, threshold values and the Mahalanobis space are produced and recorded from the variables in the film deposition step. Thereafter, processing proceeds to step S208 where the ordinary operation of the LPCVD system begins.

(j) If the values are determined as falling outside of the threshold values in step S305, processing progresses to step S501 and the operator is informed that there is abnormality of the pump by an emergency warning. Then in step S205, the process control database in the process control information storage unit 102 is instructed to begin the initial load test. In step S206, after completing the recipe of this manufacturing process, the load test sequence recipe shown in FIG. 3 that is conducted when replacing the pump is automatically output to the LPCVD main control system 53 to instruct the execution of the recipe. The load test is then started in step S306. As the load test is started, in step S402, the vibration gauge 31, temperature gauge 32, ammeter 33, vibration gauge 35, temperature gauge 36, ammeter 37, and exhaust pressure gauge 34 take measurements in each of the respective steps S1, S2, S3 and S4 as shown in FIG. 3, and measured values are continuously output in real time to the real time failure diagnosis module 533 of the LPCVD main control system 53. The real time failure diagnosis module 533, in step S307, classifies the measured values by conditions corresponding to those in steps S1, S2, S3 and S4, and from each of the measured values, calculates in real time the characteristics such as the average value over time, the time differential value, auto covariance, and the like. Moreover, in step S307, the Mahalanobis distance is calculated from the variance-covariance inverse matrix and the average value using the multivariate data as the measured values output from each of the measuring instruments 31, 32, . . . , 37 and the characteristics calculated therefrom, provided by the system information database.

(k) The real time failure diagnosis module 533, in step S308, determines whether or not the measured values output from measuring instruments 31, 32, . . . , 37 respectively and the characteristics calculated therefrom fall outside of the threshold values. In addition, in step S308 the real time failure diagnosis module 533 determines in real time whether or not the Mahalanobis distance formed by all the variables falls outside of the threshold values.

(1) In step S308, if it is determined that the results of the load test fall outside of the threshold values, in step S502, it is determined that the vacuum pump system (18 and 19) failure is exceedingly close and the operator is instructed to perform a replacement with a new vacuum pump system. However, if there is no abnormality, processing returns to the beginning and ordinary usage of the LPCVD system 5 is continued.

In the above description, determination is made solely using the measured values from the specific device called the LPCVD system 5. If, however, the device is an LPCVD system 5 of the same type connected to the CIM apparatus 1, the small amount of data can be compensated for by sharing the threshold value and Mahalanobis space. In addition, sharing data with other manufacturing companies and factories that utilize a CIM apparatus 1 as a controller is also effective. On the contrary, it is impossible to share the data with other LPCVD systems. However, by setting up the function of all the databases into the LPCVD system 5, it is possible to update the data or determine a failure quickly in real time to shorten the time required for exchanging the data on a network.

Second Embodiment

A manufacturing apparatus failure diagnosis system according to a second embodiment of the present invention is described, as with the first embodiment, using the system given in FIG. 1, which includes an LPCVD system 5, which deposits silicon nitride film ($Si_3N_4$ film) in a semiconductor manufacturing process, and a CIM apparatus 1, which controls the same. The failure diagnosis method of the manufacturing apparatus according to the second embodiment of the present invention is described in the situation where the life span of an exhaust piping from a reaction chamber 521 and of a water cooled trap 17 thereof are managed.

With the LPCVD system 5, when a silicon nitride film is deposited using ammonium and dichlorosilane gas, mainly ammonium chloride is produced as a reaction by-product. The ammonium chloride is solid at normal temperature and pressure, and may cause failure by attaching to the vacuum pump system (18 and 19) and pressure control valve 15 and stopping rotation. For this reason, as in FIG. 1, the water cooled trap 17 is set up on the reaction chamber 521 side of the vacuum pump system (18 and 19) and pressure control valve 15. However, if ammonium chloride has been collected causing the water cooled trap 17 is clogged, trouble may occur such as the loss of conductance of the evacuation system and the inability to maintain the low pressure required for the film deposition. To prevent such an occurrence, maintenance, including exchanging and cleaning is necessary. As with the first embodiment, using a failure diagnosis system illustrated in FIG. 1, the timing of maintenance such as the exchanging and cleaning of the water cooled trap 17 can be determined accurately.

Failure diagnosis for the water cooled trap 17 is described with the film deposition sequence of the manufacturing process shown in FIG. 5. In order to evacuate the reaction chamber 521 from the initial state, the opening of the pressure control valve 15, from an completely closed state of 0% to a fully opened state of 100%, is controlled by the chamber control system 52 to be opened at a temporarily constant rate. During the initial evacuation, changes in pressure inside the reaction chamber 521 from normal atmospheric pressure to a vacuum are measured by a pressure gauge 14. The time series data of the pressure gauge 14 is output to the LPCVD main control system 53 in real time, and characteristics such as the average value over time, the time differential, the time constant at low pressure and auto covariance are calculated with the CPU 532. In addition, the characteristics data from since the water cooled trap 17 has been cleaned/replaced are recorded in the system information database recorded in the system information storage unit 103. Accordingly, from the average value of the respective characteristics and the standard deviation, a control limit having a width that is twice the standard deviation of the average value is calculated as the threshold value, and is output previously from the system information storage unit 103 to the CPU 532. The CPU 532 can determine in real time whether or not the water cooled trap 17 is in a normal condition using the threshold value for the time series data and the characteristics, and may provide an emergency warning when the threshold value is exceeded.

In addition, in the film deposition step shown in FIG. 5, it is possible to correctly diagnose a failure using the present invention even when ammonium chloride has accumulated in the water cooled trap 17 and the conductance of the evacuation system has been deteriorated. During the film deposition, 0.1 SLM of dichlorosilane gas from the mass flow controller 511 and 1 SLM of ammonium gas from the mass flow controller 512 are introduced into the reaction chamber 521, respectively.

A silicon nitride film is then deposited upon the semiconductor substrate 13 being processed through the reaction of the LPCVD with thermal decomposition, the ammonium gas, which is a not-reacted gas of a source gas, and hydrogen chloride produced instead by the reaction, is cooled down on water cooled trap 17 and accumulates as ammonium chloride, making the evacuation flow route narrower, and decreasing the conductance of the evacuation system. At this point, the pressure inside of reaction chamber 521 is measured by pressure gauge 14 to keep the chamber at the desired pressure of 100 Pa by adjusting the opening of the pressure control valve 15, or more specifically, the conductance of the evacuation system. Since the conductance of the water cooled trap 17 is connected to the conductance of the pressure control valve 15 in series, the conductance of pressure control valve 15 is adjusted to be increased to balance the direction as the conductance of the water cooled trap 17 decreases. As with the output of the respective measuring instruments 31, 32, . . . , 37, the change in the opening of the pressure control valve 15 is output to the LPCVD main control system 53 and the characteristics thereof are similarly calculated by the CPU 532. Since the flow rates of the source gases are different depending on the condition thereof and, in addition, the amount consumed in reaction chamber 521 and the amount of hydrogen chloride gas produced as reaction by-product are different, the time series data for the opening of the pressure control valve 15 is classified and recorded by film deposition condition in the system information storage unit 103.

In the system information database recorded in the system information storage unit 103, the threshold value for each variable under each condition is calculated, and prior to depositing a film, the threshold value for the applicable condition is output to the real time failure diagnosis module 533 of CPU 532. This module is able to determine in real time whether or not the opening of the pressure control valve 15 exceeds the threshold value. The Mahalanobis space in the case where not only the opening value, but also time differential, second order differential and auto covariance as variables are treated as multivariate is produced in the system information database recorded in the system information storage unit 103. As with the threshold value, the value corresponding to the film deposition conditions is output to the CPU 532, allowing the Mahalanobis distance to be similarly calculated in real time and used in failure diagnosis.

Other Embodiments

The present invention has been described through the first through third embodiments as mentioned above, however the descriptions and drawings that constitute a portion of this disclosure should not be perceived as limiting this invention. Various alternative embodiments and operational techniques will become clear to persons skilled in the art from this disclosure.

In the description of the first and second embodiments mentioned above, an LPCVD system was described as an example; naturally the present invention is not limited to an LPCVD system.

For example, other semiconductor manufacturing apparatus such as a dry etching apparatus or an ion implantation apparatus, as well as, manufacturing apparatus used for chemical plants and steel plants other than semiconductor manufacturing apparatus are also applicable. An vacuum pump system with a mechanical booster pump and a dry pump connected in series was given as the vacuum pump system, however an vacuum pump system with a mechanical booster pump and an oil-sealed rotary pump connected in series is also possible. Alternatively, the invention may also be applicable to an vacuum pump system equipped solely with a dry pump or an oil-sealed rotary pump, a turbo molecular pump, or the like.

Various modifications will become possible for those skilled in the art after receiving the teachings of the present disclosure without departing from the scope thereof. In this manner, the present invention naturally includes various embodiments not specifically mentioned herein. Accordingly, the technical scope of the present invention may be limited only by the inventive features set forth by the scope of the patent claims deemed reasonable from the above description.

What is claimed is:

1. A method for diagnosing failure of a manufacturing apparatus, comprising:

measuring time series data of characteristics of a reference apparatus which conducts same processes as the manufacturing apparatus, and recording the time series data of the characteristics in a system information storage unit as a system information database;

reading out a recipe listed in a process control information database recorded in a process control information storage unit, the recipe describing a load test sequence;

driving and controlling the manufacturing apparatus, measuring time series data of the characteristics as test data, and outputting the test data in real time, in accordance with the recipe;

performing calculations on the test data, and creating failure diagnosis data; and diagnosing the failure of the manufacturing apparatus using the failure diagnosis data and the system information database.

2. The method of claim 1, wherein the load test sequence differs from a manufacturing process sequence of the manufacturing apparatus.

3. The method of claim 1, wherein a plurality of measuring results for the reference apparatus are accumulated in the system information storage unit.

4. The method of claim 1, wherein a plurality of measuring results for the reference apparatus in different production lines are accumulated in the system information storage unit.

5. The method of claim 1, wherein the failure diagnosis data calculated and produced for the test data is at least one of a data selected from the group consisting of an average value, a standard deviation value, a process capability index value, a process capability index value for evaluating deviation, an upper control limit value, a lower control limit value, an auto covariance over time, and an auto covariance over space of time series data of the characteristics.

6. The method of claim 1, wherein in the system information storage unit, a Mahalanobis space, which is produced from time series data of the characteristics of the reference apparatus under normal conditions, is recorded, and failure diagnosis of the manufacturing apparatus is performed by calculating a Mahalanobis distance of the time series data of the characteristics based on the Mahalanobis space.

7. A method for diagnosing failure of a manufacturing apparatus, comprising:
   measuring time series data characteristics of a reference apparatus which conducts same processes as the manufacturing apparatus, and recording the time series data of the characteristics in a system information storage unit as a system information database;
   reading out a recipe listed in a process control information database recorded in a process control information storage unit, the recipe describing a load test sequence having a time domain in which a load is applied which is 5 to 30 times of a normal process condition of the manufacturing apparatus;
   driving and controlling the manufacturing apparatus, measuring time series data of the characteristics as test data, and outputting the test data in real time, in accordance with the recipe;
   performing calculations on the test data, and creating failure diagnosis data; and
   diagnosing the failure of the manufacturing apparatus using the failure diagnosis data and the system information database.

8. The method of claim 7, wherein the load varies according to a step function on time axis.

9. The method of claim 7, wherein the load varies according to a rectangular wave function on time axis.

10. A failure diagnosis system, comprising:
    a manufacturing apparatus to be diagnosed for failure;
    a sensor for measuring time series data of characteristics of the manufacturing apparatus, the time series data being output in real time;
    a real time controller for operating and controlling the manufacturing apparatus in real time;
    a real time diagnosis module for receiving output of the sensor in real time, calculating the output and producing failure diagnosis data in real time, and determining failure of the manufacturing apparatus in real time;
    a system information storage unit in which data of characteristics measured for a reference apparatus performing same processes as the manufacturing apparatus is recorded as a system information database; and
    a process control information storage unit for recording a database of process control information including a recipe for operating and controlling the manufacturing apparatus and outputting instructions to the real time controller, the recipe including at least one of a manufacturing process sequence of the manufacturing apparatus and a load test sequence.

11. The system of claim 10, wherein the load test sequence differs from the manufacturing process sequence.

12. The system of claim 10, wherein a Mahalanobis space, which is produced from the time series data of the characteristics of the reference apparatus and the manufacturing apparatus under normal condition, is recorded in the system information storage unit.

13. The system of claim 12, wherein the real time diagnosis module performs failure diagnosis of the manufacturing apparatus by calculating a Mahalanobis distance from the Mahalanobis space and the failure diagnosis data.

14. The system of claim 10, wherein the manufacturing apparatus comprises:
    a reaction chamber configured to be evacuated;
    a vacuum pump system for decreasing pressure in the reaction chamber; and
    a gas supply control system introducing a reactive gas into the reaction chamber.

15. The system of claim 14, wherein the sensor measures the time series data of the characteristics of the vacuum pump system.

16. The system of claim 15, wherein a Mahalanobis space being produced from the time series data of the characteristics of the reference apparatus and the manufacturing apparatus under normal conditions, is recorded in the system information storage unit.

17. The system of claim 16, wherein the real time diagnosis module performs the failure diagnosis of manufacturing apparatus by calculating a Mahalanobis distance from the Mahalanobis space and the failure diagnosis data.

* * * * *